T. A. McGINLEY.
GEARING.
APPLICATION FILED JULY 27, 1912.

1,047,674.

Patented Dec. 17, 1912.

2 SHEETS—SHEET 1.

WITNESSES
R A Balderson

INVENTOR
Thos. A. McGinley
by Bakewell, Byrnes & Parmelee
Attys.

T. A. McGINLEY.
GEARING.
APPLICATION FILED JULY 27, 1912.

1,047,674.

Patented Dec. 17, 1912.

2 SHEETS—SHEET 2.

WITNESSES

INVENTOR

UNITED STATES PATENT OFFICE.

THOMAS A. McGINLEY, OF PITTSBURGH, PENNSYLVANIA, ASSIGNOR TO THE DUFF MANUFACTURING COMPANY, OF PITTSBURGH, PENNSYLVANIA, A CORPORATION OF PENNSYLVANIA.

GEARING.

1,047,674.  Specification of Letters Patent. Patented Dec. 17, 1912.

Application filed July 27, 1912. Serial No. 711,820.

*To all whom it may concern:*

Be it known that I, THOMAS A. MCGINLEY, a resident of Pittsburgh, Allegheny county, Pennsylvania, have invented a new and useful Improvement in Gearing, of which the following is a full, clear, and exact description, reference being had to the accompanying drawings, forming part of this specification, in which—

Figure 1:
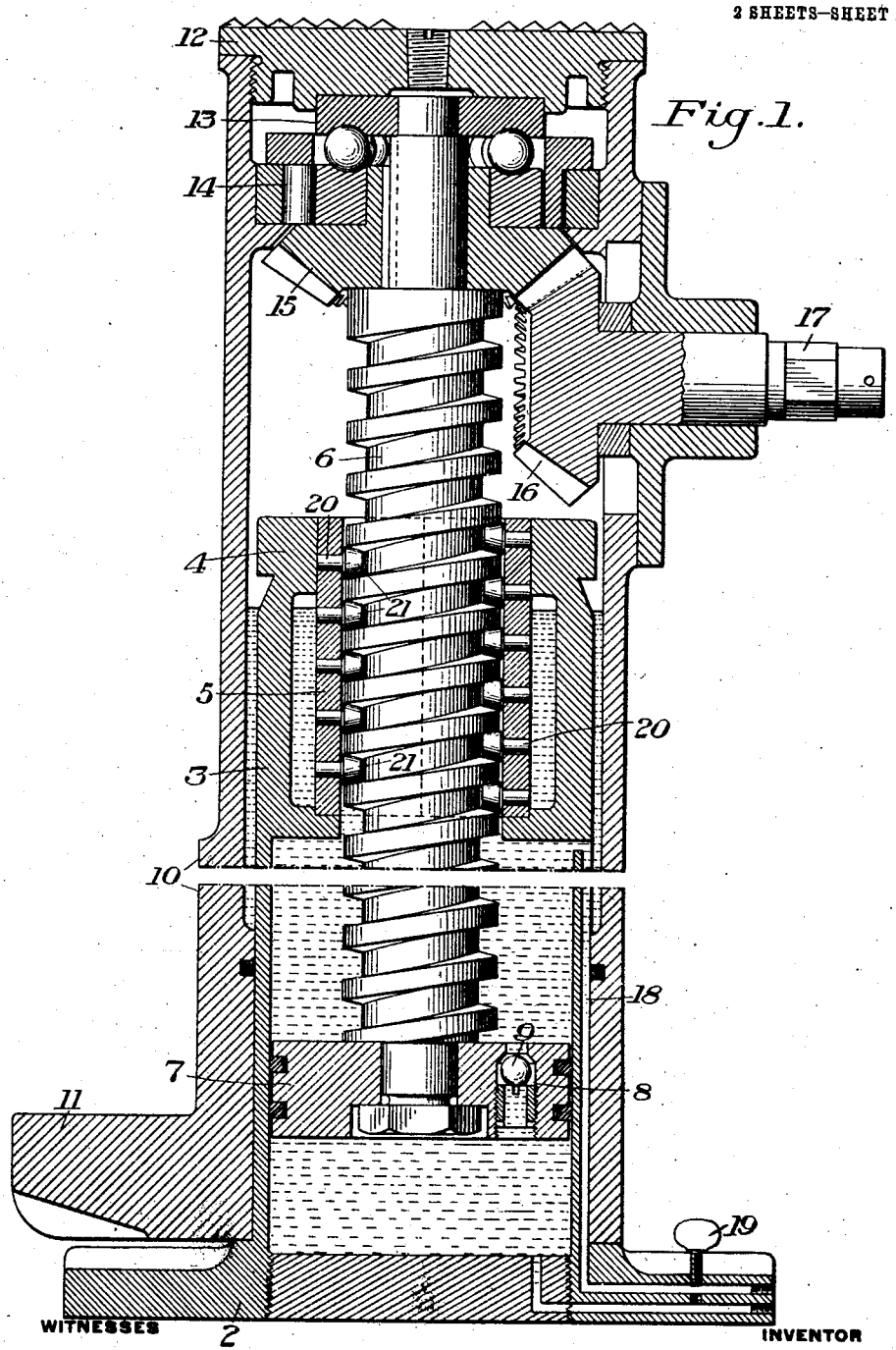
Figure 2:
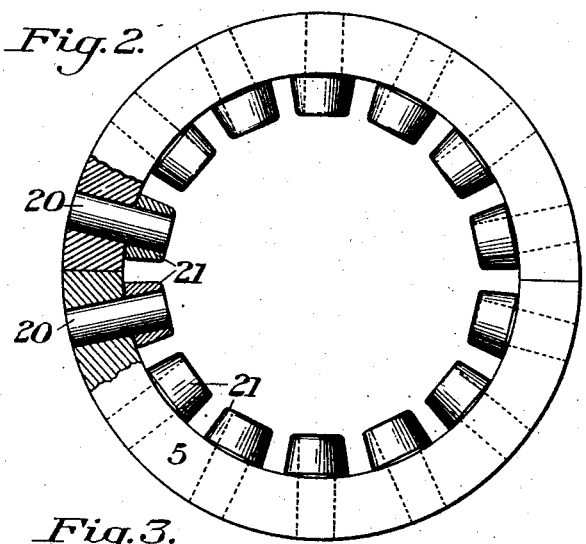
Figure 3:
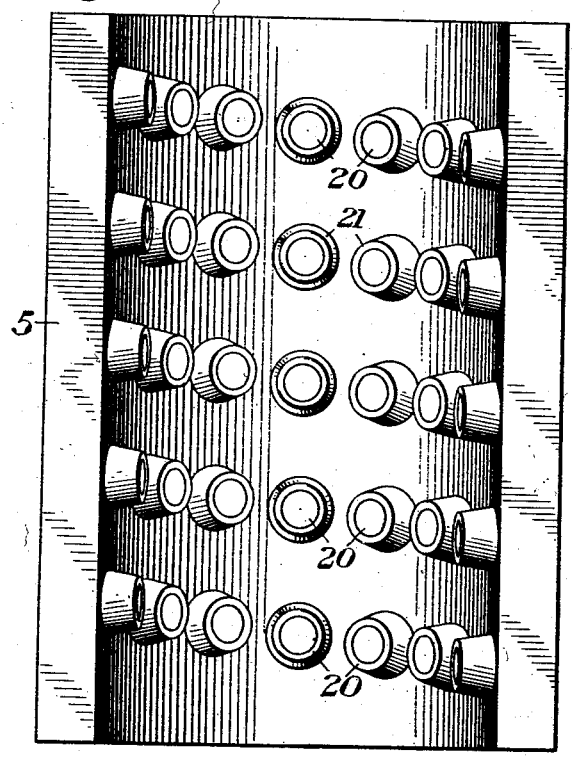

Figure 1 is a vertical section of one form of lifting jack embodying my invention; Fig. 2 is a view, partly in plan and partly in section of the nut member; and Fig. 3 is a face view of one section of the nut member.

My invention has relation to gearing particularly adapted to lifting jacks, and more especially to that class of lifting jacks which are commonly known as high-speed screw jacks. It is well known that in the operation of these jacks, a large amount of the power employed in operating the jack is consumed in overcoming the friction between the nut and the screw. The present invention is designed to provide a novel form of nut member, by means of which the friction between the nut and screw may be reduced to a minimum.

The nature of my invention will be best understood by reference to the accompanying drawings, in which I have shown one embodiment thereof, and which will now be described.

In these drawings I have shown the invention as applied to one particular type of screw jack, but I desire it understood that the invention is equally applicable to screw jacks of other specific kinds, as well as gearing generally where high power is obtained by means of a screw.

In these drawings, the numeral 2 designates the base of the jack, having an upwardly extending cylinder 3 provided with a head 4, in which is formed a cavity for a central nut 5. 6 is a quick-pitch screw stem, which extends down through the nut and has rotary engagement at its lower end with a piston 7. This piston works within the lower dash-pot-forming portion of the cylinder 3, and is provided with the by-pass opening 8 therethrough controlled by an upwardly seating ball balve 9. The cylinder and bore of the casing are filled with oil or other suitable fluid, as indicated. Surrounding the cylinder 3 is the lifting shell 10, which may have a foot lift 11 at one side thereof, and which carries at its upper end the lifting plate or head 12.

13 and 14 designate the bearing and clutch devices for the head, which devices constitute no part of the present invention, and which may be of any suitable character. 15 is a bevel gear wheel secured to the upper portion of the shaft or stem 6, and which is driven by a bevel gear wheel 16 on an actuating shaft 17.

18 designates a by-pass passage for the dash pot liquid, and which is arranged to be controlled by an adjustable valve 19.

The nut 5 is provided with a plurality of pins 20 secured in holes drilled or bored therein, these holes being arranged in helical lines corresponding to the pitch of the threads of the screw shaft or stem 6. On the projecting inner end of each of these pins 20 is journaled an anti-friction roller 21. These rollers have coned surfaces, which are radial with respect to the axial center of the shaft 6, and which are adapted to engage the threads of said shaft in the manner clearly shown in Fig. 1.

The jack is operated in the usual manner of these jacks, the load being lifted by actuating the screw shaft 17. When it is desired to allow the load to move down under the fluid control, the suitably arranged clutch device is released, allowing the load to force the lifting shell downwardly as rapidly as the transfer of the fluid from the lower to the upper side of the piston 7 will permit.

By providing the nut with a plurality of anti-friction rollers arranged as described, whereby the entire frictional engagement between the screw stem or shaft and the nut takes place on these rollers, friction between the parts is reduced to a minimum.

What I claim is:—

1. A lifting member having a helical screw stem or shaft, and a cylinder member having a nut provided with a plurality of helically arranged anti-friction rollers engaged in the threads of the nut; substantially as described.

2. The combination with a helical screw member and a relatively fixed nut, the latter having a plurality of helically arranged internal anti-friction rollers; substantially as described.

3. The combination with a helical screw member and a relatively fixed nut, the latter having a plurality of helically arranged internal anti-friction rollers, the surfaces of said rollers being coned; substantially as described.

In testimony whereof, I have hereunto set my hand.

THOMAS A. McGINLEY.

Witnesses:
 Geo. J. Taylor,
 A. F. Tibbetts.